US011519853B2

(12) United States Patent
Kang et al.

(10) Patent No.: US 11,519,853 B2
(45) Date of Patent: Dec. 6, 2022

(54) METHOD FOR EVALUATING THE SUITABILITY FOR POWER GENERATION USING BIOGAS, SERVER AND SYSTEM USING THE SAME

(71) Applicant: AJOU UNIVERSITY INDUSTRY-ACADEMIC COOPERATION FOUNDATION, Suwon-si (KR)

(72) Inventors: Ju Young Kang, Suwon-si (KR); Jae Hyeong Park, Busan (KR); Sang Ho Ahn, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/711,478

(22) Filed: Apr. 1, 2022

(65) Prior Publication Data
US 2022/0317035 A1 Oct. 6, 2022

(30) Foreign Application Priority Data
Apr. 2, 2021 (KR) .................. 10-2021-0043383

(51) Int. Cl.
*G01N 21/3504* (2014.01)
*G01B 11/28* (2006.01)
*G06T 7/60* (2017.01)

(52) U.S. Cl.
CPC ......... *G01N 21/3504* (2013.01); *G01B 11/28* (2013.01); *G06T 7/60* (2013.01)

(58) Field of Classification Search
CPC ........ G01N 21/3504; G01B 11/28; G06T 7/60
See application file for complete search history.

(56) References Cited

U.S. PATENT DOCUMENTS

2010/0206807 A1\* 8/2010 Ripley ..................... C02F 3/28
210/603

FOREIGN PATENT DOCUMENTS

| JP | 2008-282075 A | 11/2008 |
| KR | 10-2017-0033147 A | 3/2017 |
| KR | 10-2136843 B1 | 7/2020 |

OTHER PUBLICATIONS

Lee, Hyun Jik et al., "Design of Database and System for Application of Forest Biomass, Journal of the Korean Society for Geospatial Information System", 2013, pp. 13-20, vol. 21, No. 4.
(Continued)

*Primary Examiner* — Tri T Ton
(74) *Attorney, Agent, or Firm* — Sughrue Mion, PLLC

(57) ABSTRACT

Provided are a method of evaluating biogas power generation suitability performed by a biogas power generation suitability evaluation server including a processor and a memory, the method comprises extracting, from satellite image data of an evaluation target area, an area corresponding to the evaluation target area, calculating a size of biogas generation facilities included in the evaluation target area based on the extracted area, calculating a biogas concentration of the evaluation target area from the satellite image data and evaluating the biogas power generation suitability based on the size of the biogas generation facilities and the biogas concentration of the evaluation target area, wherein the calculating of the biogas concentration of the evaluation target area comprises calculating an average value of biogas concentrations of area corresponding to the evaluation target area, and the evaluating of the biogas power generation suitability comprises calculating, based on the size of the biogas generation facilities that are livestock barns and the average value of the biogas concentrations of the areas corresponding to the evaluation target area, a size of livestock in the livestock barns, and calculating biogas power
(Continued)

generation potential in the evaluation target area based on the size of livestock in the livestock barns.

10 Claims, 4 Drawing Sheets

(56) References Cited

OTHER PUBLICATIONS

Notification of Reason for Refusal of KR10-2021-0043383 dated Jun. 8, 2021 from Korean Patent Office.
Decision to Patent Grant of KR10-2021-0043383 dated Sep. 24, 2021 from Korean Patent Office.

* cited by examiner

METHOD FOR EVALUATING THE SUITABILITY FOR POWER GENERATION USING BIOGAS, SERVER AND SYSTEM USING THE SAME

CROSS-REFERENCE TO RELATED APPLICATIONS

This application claims the benefit of Korean Patent Application No. 10-2021-0043383, filed on Mar. 2, 2021, in the Korean Intellectual Property Office, the disclosure of which is incorporated herein in its entirety by reference.

BACKGROUND

1. Field

The disclosure relates to a method of evaluating biogas power generation suitability, a server and a system using the same, and more particularly, to a method of evaluating biogas power generation suitability in a corresponding area based on a size of biogas generation facilities and a biogas concentration calculated from satellite image data, and a server and a system using the same.

2. Description of the Related Art

Recently, as phenomena that clearly show the global climate crisis have appeared, climate problems have emerged, and the emission of greenhouse gases is pointed out as a representative cause of the climate crisis.

Greenhouse gases include carbon dioxide and methane. Although methane is emitted relatively little, it has a greenhouse effect that is ten times greater than carbon dioxide, which is known to have a large greenhouse effect.

Methane is mainly generated from livestock manure, but biogas power generation using livestock manure has not increased significantly due to legal regulations and cost problems associated with the treatment of by-products generated after power generation.

SUMMARY

Provided are a method of evaluating biogas power generation suitability in a corresponding area based on a size of biogas generation facilities and a biogas concentration calculated from satellite image data, and a server and a system using the same.

According to an aspect of an embodiment, a method of evaluating biogas power generation suitability performed by a biogas power generation suitability evaluation server including a processor and a memory may comprise extracting, from satellite image data of an evaluation target area, an area corresponding to the evaluation target area, calculating a size of biogas generation facilities included in the evaluation target area based on the extracted area, calculating a biogas concentration of the evaluation target area from the satellite image data and evaluating the biogas power generation suitability based on the size of the biogas generation facilities and the biogas concentration of the evaluation target area, wherein the calculating of the biogas concentration of the evaluation target area may comprise calculating an average value of biogas concentrations of area corresponding to the evaluation target area, and the evaluating of the biogas power generation suitability may comprise calculating, based on the size of the biogas generation facilities that are livestock barns and the average value of the biogas concentrations of the areas corresponding to the evaluation target area, a size of livestock in the livestock barns, and calculating biogas power generation potential in the evaluation target area based on the size of livestock in the livestock barns.

In some embodiments, the extracting of the area corresponding to the evaluation target area may comprise extracting the area corresponding to the evaluation target area from the satellite image data based on an address and cadastral data corresponding to the evaluation target area input by a user.

In some embodiments, the calculating of a size of biogas generation facilities included in the evaluation target area may comprise extracting a roof boundary of the biogas generation facilities included in the evaluation target area and calculating the size of the biogas generation facilities based on the extracted roof boundary.

In some embodiments, the biogas power generation suitability evaluation server may classify the satellite image data of the evaluation target area by color channel, and extracts the roof boundary based on a brightness value of at least one color channel.

In some embodiments, the color channel may be a red (R) channel, a green (G) channel, or a blue (B) channel.

In some embodiments, the calculating of a size of biogas generation facilities included in the evaluation target area may comprise calculating a size of the biogas generation facilities based on an area inside the extracted roof boundary.

In some embodiments, the satellite image data may comprise hyperspectral image data.

In some embodiments, the method may further comprise searching whether there is a space for installing power generation facilities with a power generation scale corresponding to the calculated biogas power generation potential in an area adjacent to the evaluation target area.

In some embodiments, the method may further comprise evaluating the evaluation target area as being suitable for biogas power generation when there is a space for installing power generation facilities with a power generation scale corresponding to the calculated biogas power generation potential in the area adjacent to the evaluation target area.

According to an aspect of an embodiment, a biogas power generation suitability evaluation server including a processor and a memory may comprise an evaluation target area extraction module configured to extract, from satellite image data of an evaluation target area, an area corresponding to the evaluation target area, a biogas generation facility size calculation module configured to calculate a size of biogas generation facilities included in the evaluation target area based on the extracted area, a biogas concentration calculation module configured to calculate a biogas concentration of the evaluation target area from the satellite image data and a biogas power generation suitability evaluation module configured to evaluate biogas power generation suitability based on the size of the biogas generation facilities and the biogas concentration of the evaluation target area, wherein the biogas concentration calculation module may calculate an average value of biogas concentrations of area corresponding to the evaluation target area, and the biogas power generation suitability evaluation module may calculate, based on the size of the biogas generation facilities that are livestock barns and the average value of the biogas concentrations of the areas corresponding to the evaluation target area, a size of livestock in the livestock barns, and calculates biogas power generation potential in the evaluation target area based on the size of livestock in the livestock barns.

According to an aspect of an embodiment, a biogas power generation suitability evaluation system may comprise a user terminal and a biogas power generation suitability evaluation server configured to provide biogas power generation suitability evaluation information to the user terminal corresponding to a user's input input through the user terminal, wherein the biogas power generation suitability evaluation server may comprise an evaluation target area extraction module configured to extract, from satellite image data of an evaluation target area, an area corresponding to the evaluation target area, a biogas generation facility size calculation module configured to calculate a size of biogas generation facilities included in the evaluation target area based on the extracted area, a biogas concentration calculation module configured to calculate the biogas concentration of the evaluation target area from the satellite image data and a biogas power generation suitability evaluation module configured to evaluate biogas power generation suitability based on the size of the biogas generation facilities and the biogas concentration of the evaluation target area, wherein the biogas concentration calculation module may calculate an average value of biogas concentrations of area corresponding to the evaluation target area, and the biogas power generation suitability evaluation module may calculate, based on the size of the biogas generation facilities that are livestock barns and the average value of the biogas concentrations of the areas corresponding to the evaluation target area, a size of livestock in the livestock barns, and calculates biogas power generation potential in the evaluation target area based on the size of livestock in the livestock barns.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
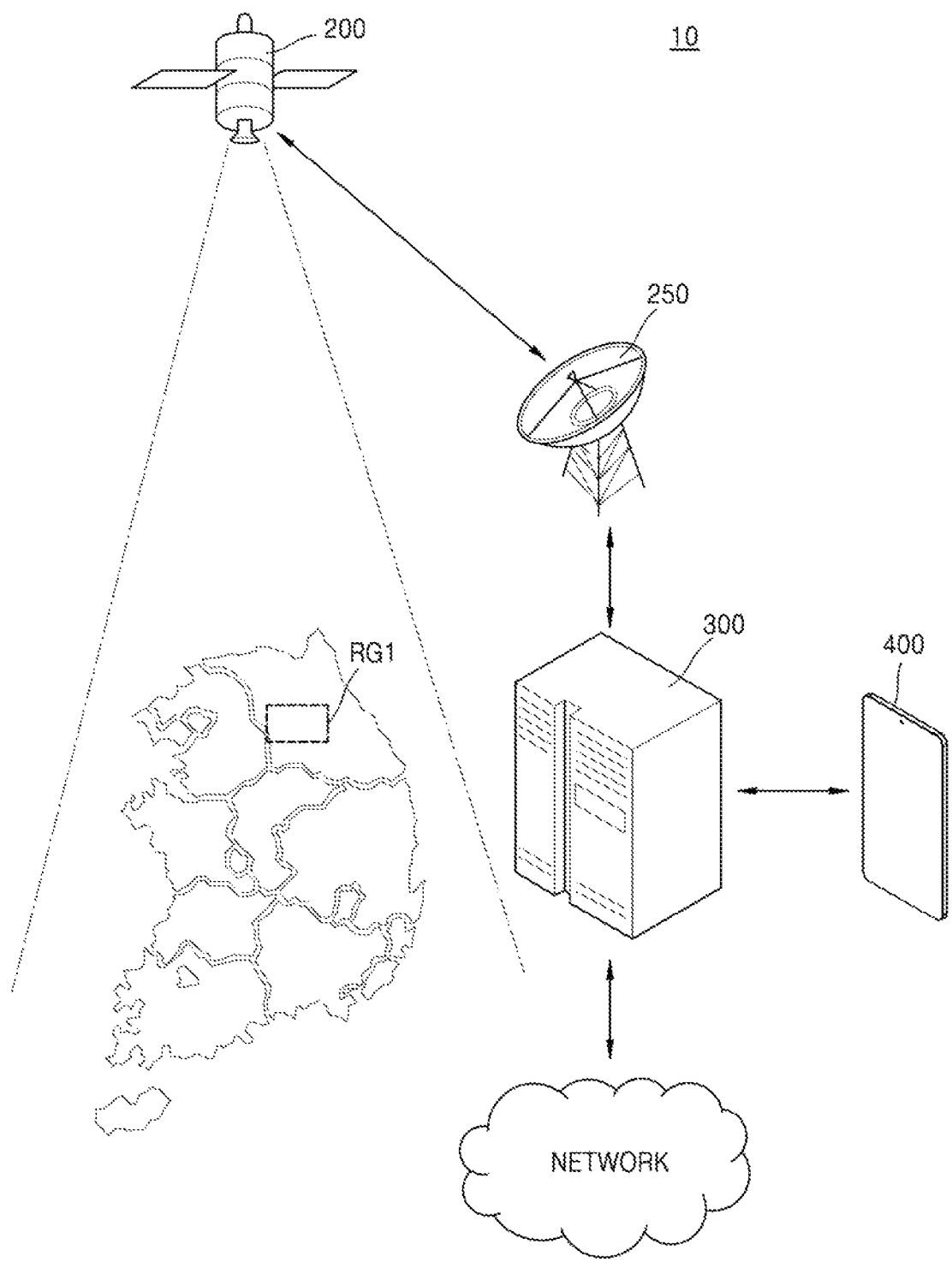
FIG. 1 is a conceptual diagram of a biogas power generation suitability evaluation system according to an embodiment.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system. Furthermore, the system may include a memory that stores program or data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail.

As used herein, the term "biogas" may broadly refer to a gas that is generated by utilizing an organic material and that can be used for power generation by being used as a fuel for a generator.

As used herein, the term "biogas generation facilities" may broadly refer to various facilities capable of generating the above biogas (e.g., livestock barns, etc.)

Hereinafter, embodiments of the disclosure will be described in detail in turn.

FIG. 1 is a conceptual diagram of a biogas power generation suitability evaluation system 10 according to an embodiment.

Referring to FIG. 1, the biogas power generation suitability evaluation system 10 according to an embodiment is a system capable of calculating biogas power generation potential generated in an evaluation target area RG1 and evaluating whether the evaluation target area RG1 is suitable for installing power generation facilities, and may include a satellite 200, a ground station 250, a biogas power generation suitability evaluation server 300, and a user terminal 400.

According to an embodiment, the evaluation target area RG1 may be an area corresponding to an input input by a user through the user terminal 400.

According to another embodiment, the evaluation target area RG1 may be an area selected by the biogas power generation suitability evaluation server 300.

The satellite 200 may obtain a satellite image about the evaluation target area RG1 by using a satellite camera mounted on the satellite 200 and may transmit satellite image data about the obtained satellite image to the ground station 250.

According to an embodiment, the satellite 200 may transmit satellite image data including a hyperspectral image to the ground station 250 by using a hyperspectral camera mounted on the satellite 200.

The ground station 250 is located on the ground and may include a satellite antenna to receive various data transmitted from the satellite 200. The ground station 250 may receive the satellite image data transmitted from the satellite 200, and transmit the received satellite image data to the biogas power generation suitability evaluation server 300.

According to an embodiment, the biogas power generation suitability evaluation system 10 may be implemented in a form that does not include the ground station 250.

According to another embodiment, the biogas power generation suitability evaluation system 10 may include a separate server (not shown) for managing satellite image data, and in this case, the biogas power generation suitability evaluation system 10 may receive satellite image data from the separate server (not shown).

The biogas power generation suitability evaluation server 300 may receive the satellite image data transmitted from the ground station 250, and may evaluate biogas power generation suitability in an evaluation target area based on the received satellite image data.

According to an embodiment, the biogas power generation suitability evaluation server 300 may extract an evaluation target area corresponding to an address input by a user through the user terminal 400, and may evaluate biogas power generation suitability in the extracted evaluation target area.

In this case, the biogas power generation suitability evaluation server 300 may collect cadastral data corresponding to an address input through a wired or wireless network to extract the evaluation target area corresponding to the address input by the user. The biogas power generation suitability evaluation server 300 may extract an area corresponding to the evaluation target area from satellite image data by using the address input by the user and the collected cadastral data together.

The biogas power generation suitability evaluation server 300 may provide biogas power generation suitability evaluation information in the evaluation target area to the user terminal 400.

The detailed structure and operation of the biogas power generation suitability evaluation server 300 will be described later with reference to FIGS. 2 to 4.

A user may receive biogas power generation suitability evaluation information in an evaluation target area through the user terminal 400.

According to an embodiment, the user terminal 400 may be implemented as a communication-enabled terminal. Although a smartphone is shown as an exemplary form of the user terminal 400 in FIG. 1, the user terminal 400 may be implemented as various types of devices capable of wired/wireless communication (e.g., PC, etc.).

Figure 2:
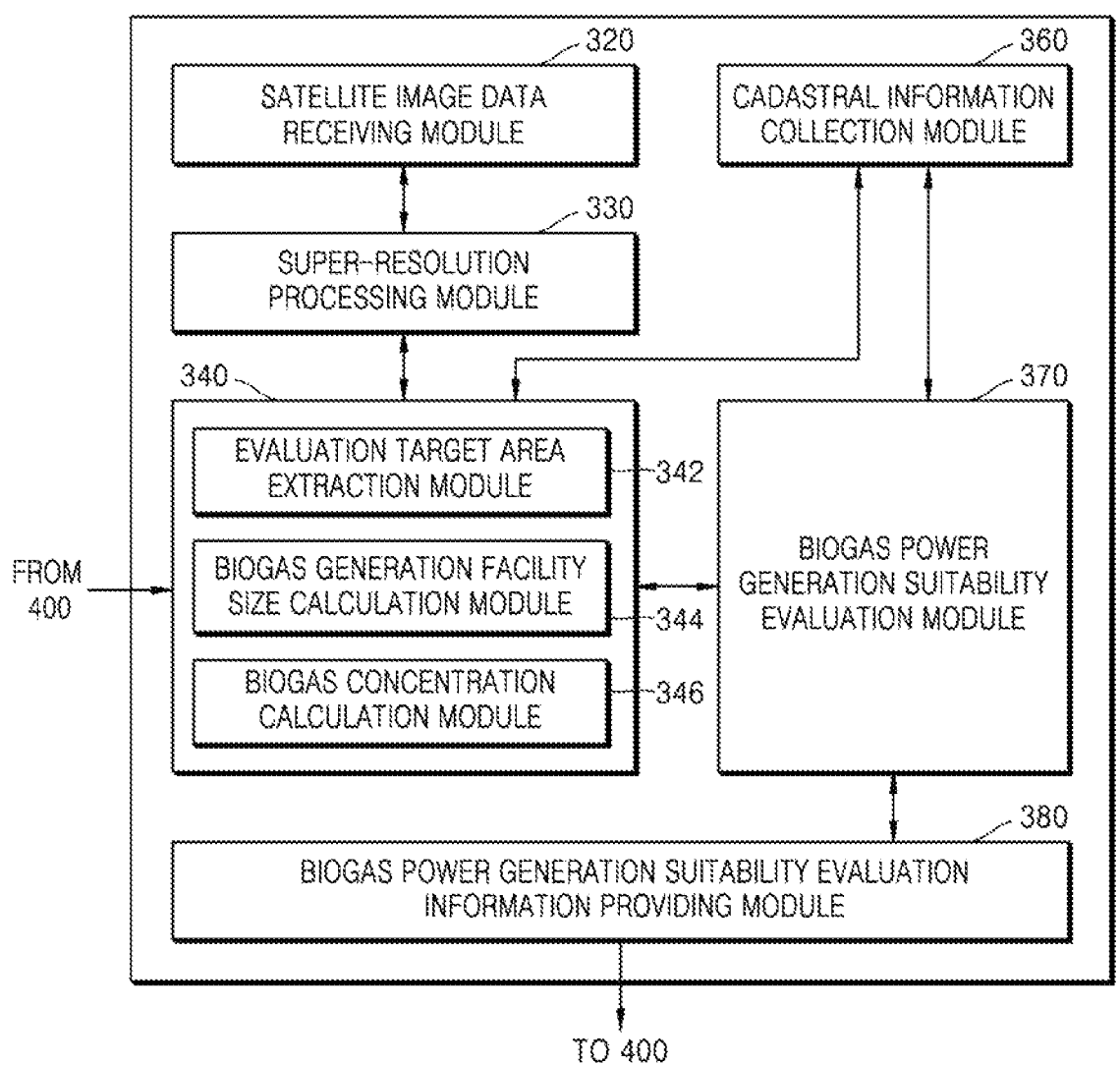
FIG. 2 is a block diagram of a biogas power generation suitability evaluation server shown in FIG. 1, according to an embodiment.

FIG. 2 is a block diagram of the biogas power generation suitability evaluation server 300 shown in FIG. 1, according to an embodiment. FIG. 3 is a view illustrating a process of performing evaluation by specifying an evaluation target area in the biogas power generation suitability evaluation server 300 shown in FIG. 2.

Referring to FIGS. 1 and 2, the biogas power generation suitability evaluation server 300 may include a satellite image data receiving module 320, a super-resolution processing module 330, a data extraction and analysis module 340, a cadastral information collection module 360, a biogas power generation suitability evaluation module 370, and a biogas power generation suitability evaluation information providing module 380.

The satellite image data receiving module 320 may receive satellite image data transmitted from the satellite 200, and transmit the received satellite image data to the super-resolution processing module 330.

According to an embodiment, the satellite image data receiving module 320 may process (e.g., resizing data, changing format) the received satellite image data into a form suitable for use in the biogas power generation suitability evaluation server 300.

The super-resolution processing module 330 may perform super-resolution processing of the satellite image data received from the satellite image data-receiving module 320 and generate super-resolution processed satellite image data.

According to an embodiment, the super-resolution processing module 330 may improve a resolution of the satellite image data by using various processing techniques (e.g., high frequency component reconstruction, pre-processing filtering, super-resolution filtering, post-processing filtering, etc.).

According to an embodiment, the configuration of the super-resolution processing module 330 in the server 300 may be implemented while being omitted.

The data extraction and analysis module 340 may include an evaluation target area extraction module 342, a biogas generation facility size calculation module 344, and a biogas concentration calculation module 346.

The evaluation target area extraction module 342 may extract an area corresponding to an evaluation target area from received satellite image data.

According to an embodiment, when a user inputs an address for an evaluation target area through the user terminal 400, the evaluation target area extraction module 342 may request cadastral information about the corresponding address from the cadastral information collection module 360. The evaluation target area extraction module 342 may extract an area corresponding to the evaluation target area from the satellite image data based on the cadastral data about the evaluation target area received from the cadastral information collection module 360.

Figure 3:
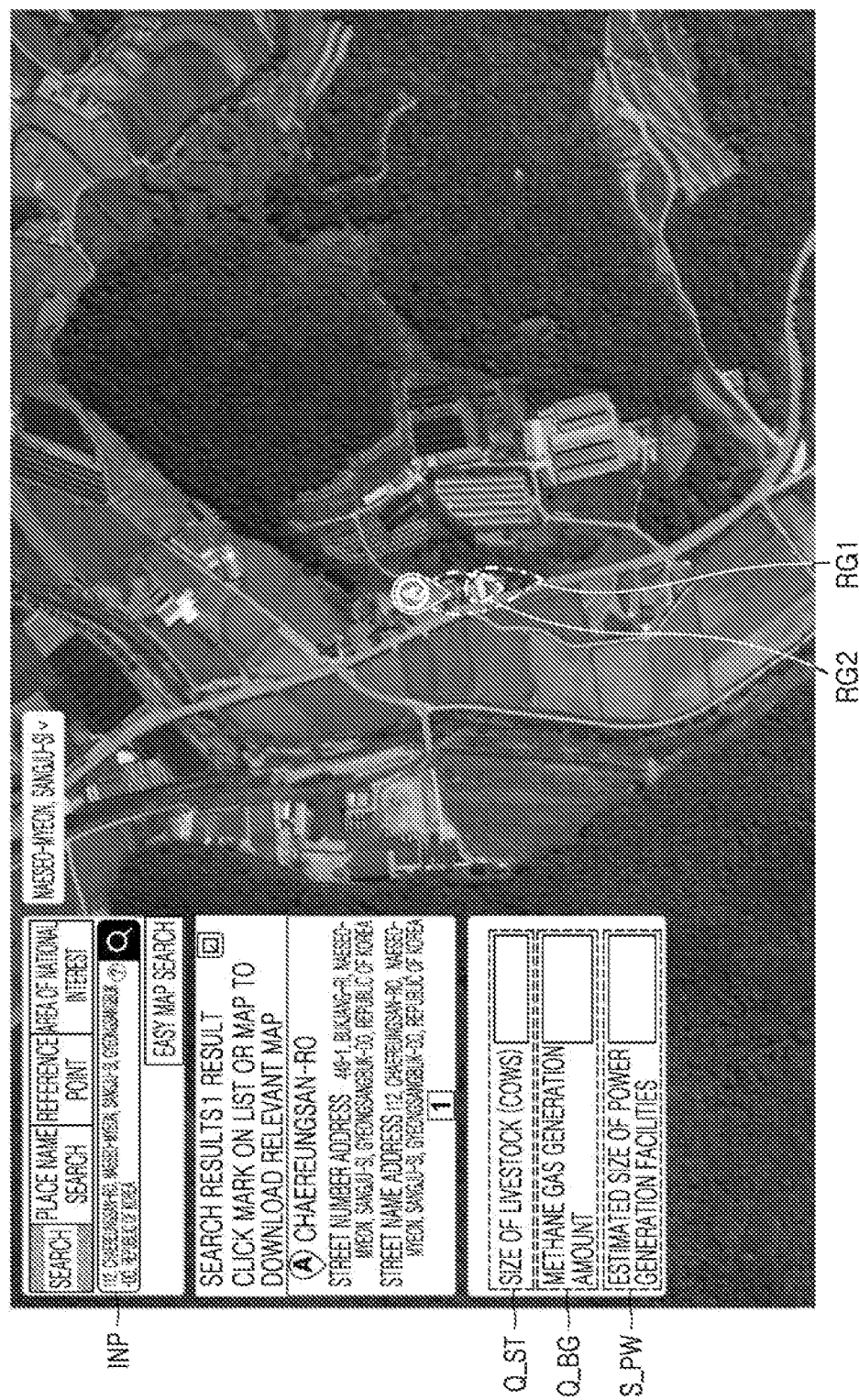
FIG. 3 is a view illustrating a process of performing evaluation by specifying an evaluation target area in the biogas power generation suitability evaluation server shown in FIG. 2.

Referring to FIG. 3 together, when a user inputs an address in an address input column INP of an evaluation target area through the user terminal 400, the evaluation target area RG1 corresponding to the input address may be extracted based on the input address and cadastral data.

Returning to FIG. 2, the biogas generation facility size calculation module 344 may calculate a size of biogas generation facilities included in the evaluation target area based on the evaluation target area RG1 extracted by the evaluation target area extraction module 342.

According to an embodiment, the biogas generation facility size calculation module 344 may extract a roof boundary of the biogas generation facilities included in the evaluation target area and calculate the size of the biogas generation facilities based on the extracted roof boundary.

Referring to FIG. 3 together, the biogas generation facility size calculation module 344 may extract an area RG2 corresponding to the biogas generation facilities from within the evaluation target area RG1 extracted by the evaluation target area extraction module 342.

According to an embodiment, the biogas generation facility size calculation module 344 may classify satellite image data of the evaluation target area for each color channel (e.g., red (R) channel, green (G) channel, or blue (B) channel) and extract a roof boundary based on a brightness value of at least one color channel. In this case, the biogas generation facility size calculation module 344 may extract a portion in which a change in a brightness value exceeds a reference value in satellite image data of at least one color channel as a roof boundary of biogas generation facilities.

According to an embodiment, the biogas generation facility size calculation module 344 may calculate a size of the biogas generation facilities based on an area inside the extracted roof boundary (e.g., RG2) of the biogas generation facilities. In this case, the calculated size of the biogas generation facilities may be proportional to the area inside the extracted roof boundary (e.g., RG2) of the biogas generation facilities.

Returning to FIG. 2, the biogas concentration calculation module 346 may calculate a biogas concentration of an evaluation target area from satellite image data.

According to an embodiment, the biogas concentration calculation module 346 may calculate a biogas concentration of an evaluation target area by using hyperspectral image data included in satellite image data. For example, the biogas concentration calculation module 346 may calculate a methane concentration of the evaluation target area by using the hyperspectral image data included in the satellite image data.

According to an embodiment, the biogas concentration calculation module 346 may calculate an average value of a biogas concentration of an area corresponding to the evaluation target area.

The cadastral information collection module 360 may collect cadastral data through a wired or wireless network, and may provide the collected cadastral data according to a request of the evaluation target area extraction module 342.

The biogas power generation suitability evaluation module 370 may evaluate biogas power generation suitability based on a size of biogas generation facilities included in an evaluation target area calculated by the biogas generation facility size calculation module 344 and a biogas concentration of the evaluation target area calculated by the biogas concentration calculation module 346.

According to an embodiment, when the biogas generation facilities are livestock barns, the biogas power generation suitability evaluation module 370 may calculate a size of livestock in the livestock barns based on the size of the biogas generation facilities and the biogas concentration of the evaluation target area.

Referring to FIG. 3 together, the biogas power generation suitability evaluation module 370 may calculate the size of livestock in the livestock barns in proportion to the product of the size of the biogas generation facilities and the biogas concentration of the evaluation target area. The calculated size of livestock may be output through a first output column Q_ST.

The biogas power generation suitability evaluation module 370 may calculate the amount of methane gas generated by using the calculated size of livestock, the amount of manure produced per head of livestock, and the amount of methane gas that may be generated according to the unit amount of manure. For example, the amount of methane gas generated may be calculated by multiplying the calculated size of livestock, the amount of manure produced per head of livestock, and the amount of methane gas generated according to the unit amount of manure. The calculated amount of methane gas generated may be output through a second output column Q_BG.

The biogas power generation suitability evaluation module 370 may calculate biogas power generation potential (or an estimated size of power generation facilities) in the evaluation target area by using the calculated amount of methane gas generated. The calculated biogas power generation potential (or the estimated size of power generation facilities) may be output through a third output column S_PW.

The biogas power generation suitability evaluation module 370 may search whether there is a space for installing power generation facilities of a power generation scale corresponding to the calculated biogas power generation potential in an area adjacent to the evaluation target area (e.g., an area within a standard distance from the evaluation target area).

According to an embodiment, the biogas power generation suitability evaluation module 370 may search, by using cadastral data together, whether there is a space for installing power generation facilities of a power generation scale corresponding to the calculated biogas power generation potential among the land available for biogas power plant installation, in an area adjacent to the evaluation target area (e.g., an area within a standard distance from the evaluation target area).

Returning to FIG. 2, the biogas power generation suitability evaluation information-providing module 380 may process biogas power generation suitability evaluation information of an evaluation target area into a form that is easy for a user to recognize by the biogas power generation suitability evaluation module 170 and provide the information to the user terminal 400.

According to an embodiment, the biogas power generation suitability evaluation server 300 may be implemented to include a memory or database for storing collected data, and a processor for processing the collected data. In this case, each of the components 320 to 380 of the biogas power generation suitability evaluation server 300 may include a combination of the memory or database and the processor.

According to an embodiment, a method of evaluating biogas power generation suitability according to an embodiment may be implemented as program code and stored in a medium, and the medium may be combined with a processor to perform the method of evaluating biogas power generation suitability.

Figure 4:
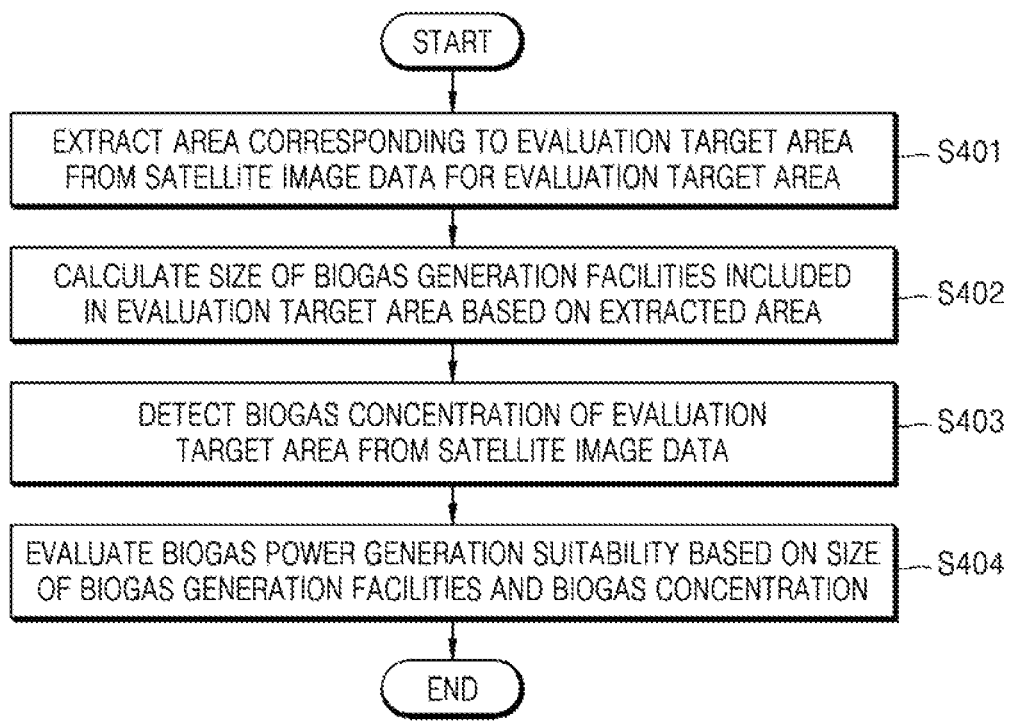
FIG. 4 is a flowchart illustrating a method of evaluating biogas power generation suitability according to an embodiment.

FIG. 4 is a flowchart illustrating a method of evaluating biogas power generation suitability according to an embodiment.

Referring to FIGS. 1 to 4, in operation S401, the biogas power generation suitability evaluation server 300 may extract an area corresponding to an evaluation target area from satellite image data for the evaluation target area.

According to an embodiment, the biogas power generation suitability evaluation server 300 may extract the area corresponding to the evaluation target area based on an address of the evaluation target area input by a user and cadastral data corresponding thereto.

In operation S402, the biogas power generation suitability evaluation server 300 may calculate a size of biogas generation facilities included in the evaluation target area, based on the extracted area.

According to an embodiment, the biogas power generation suitability evaluation server 300 may extract a roof boundary of the biogas generation facilities within the extracted area and calculate the size of the biogas generation facilities based on an area inside the extracted roof boundary.

In operation S403, the biogas power generation suitability evaluation server 300 may detect a biogas concentration of the evaluation target area from the satellite image data.

According to an embodiment, the biogas power generation suitability evaluation server 300 may use hyperspectral image data included in the satellite image data to calculate an average value of biogas concentrations of area corresponding to the evaluation target area.

In operation S404, the biogas power generation suitability evaluation server 300 may evaluate biogas power generation suitability based on the size of the biogas generation facilities calculated through operation S402 and the biogas concentration of the evaluation target area calculated through operation S403.

According to an embodiment, the biogas power generation suitability evaluation server 300 may calculate the biogas power generation potential in the evaluation target area based on the size of the biogas generation facilities calculated through operation S402 and the biogas concentration of the evaluation target area calculated through operation S403, and may evaluate the biogas power generation suitability of the evaluation target area depending on the possibility of installing power generation facilities with a power generation scale corresponding to the calculated biogas power generation potential in an area adjacent to the evaluation target area. In this case, the biogas power generation suitability evaluation server 300 may evaluate the evaluation target area as being suitable for biogas power generation when there is a space for installing power generation facilities with a power generation scale corresponding to the calculated biogas power generation potential in the area adjacent to the evaluation target area.

A method and a device according to an embodiment may efficiently evaluate biogas power generation suitability of a corresponding area based on a size of biogas generation facilities and a biogas concentration calculated from satellite image data.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

What is claimed is:

1. A method of evaluating biogas power generation suitability performed by a biogas power generation suitability evaluation server including a processor and a memory, the method comprising:
  extracting, from satellite image data of an evaluation target area, an area corresponding to the evaluation target area;
  calculating a size of biogas generation facilities included in the evaluation target area based on the extracted area;
  calculating a biogas concentration of the evaluation target area from the satellite image data; and
  evaluating the biogas power generation suitability based on the size of the biogas generation facilities and the biogas concentration of the evaluation target area,
  wherein the calculating of the biogas concentration of the evaluation target area comprises:
  calculating an average value of biogas concentrations of area corresponding to the evaluation target area, and
  the evaluating of the biogas power generation suitability comprises:
  calculating, based on the size of the biogas generation facilities that are livestock barns and the average value of the biogas concentrations of the areas corresponding to the evaluation target area, a size of livestock in the livestock barns, and calculating biogas power generation potential in the evaluation target area based on the size of livestock in the livestock barns.

2. The method of claim 1, wherein the calculating of a size of biogas generation facilities included in the evaluation target area comprises:
  extracting a roof boundary of the biogas generation facilities included in the evaluation target area and calculating the size of the biogas generation facilities based on the extracted roof boundary.

3. The method of claim 2, wherein the biogas power generation suitability evaluation server classifies the satellite image data of the evaluation target area by color channel, and extracts the roof boundary based on a brightness value of at least one color channel.

4. The method of claim 3, wherein the color channel is a red (R) channel, a green (G) channel, or a blue (B) channel.

5. The method of claim 4, wherein the calculating of a size of biogas generation facilities included in the evaluation target area comprises:
  calculating a size of the biogas generation facilities based on an area inside the extracted roof boundary.

6. The method of claim 5, wherein the satellite image data comprises:
  hyperspectral image data.

7. The method of claim 1, further comprising:
  searching whether there is a space for installing power generation facilities with a power generation scale corresponding to the calculated biogas power generation potential in an area adjacent to the evaluation target area.

8. The method of claim 7, further comprising:
  evaluating the evaluation target area as being suitable for biogas power generation when there is a space for installing power generation facilities with a power generation scale corresponding to the calculated biogas power generation potential in the area adjacent to the evaluation target area.

9. A biogas power generation suitability evaluation server including a processor and a memory storing instructions executable by the processor,
  wherein the processor is configured to execute the instructions to:
    extract, from satellite image data of an evaluation target area, an area corresponding to the evaluation target area;
    calculate a size of biogas generation facitlities included in the evaluation target area based on the extracted area;
    calculate a biogas concentration of the evaluation target area from the satellite image data; and
    evaluate biogas power generation suitability based on the size of the biogas generation facilities and the biogas concentration of the evaluation target area,
  wherein the processor is further configured to execute the instruction to calculate an average value of biogas concentrations of area corresponding to the evaluation target area, and
  wherein the processor is further configured to execute the instructions to calculate, based on the size of the biogas generation facilities that are livestock barns and the average value of the biogas concentrations of the areas corresponding to the evaluation target area, a size of livestock in the livestock barns, and calculate biogas power generation potential in the evaluation target area based on the size of livestock in the livestock barns.

10. A biogas power generation suitability evaluation system comprising:

a user terminal; and a biogas power generation suitability evaluation server configured to provide biogas power generation suitability evaluation information to the user terminal corresponding to a user's input input through the user terminal, wherein the biogas power generation suitability evaluation server comprises a processor and a memory storing instructions executable by the processor;

wherein the processor is configured to execute the instructions to:

extract, from satellite image data of an evaluation target area, an area corresponding to the evaluation target area;

calculate a size of biogas generation facilities included in the evaluation target area based on the extracted area;

calculate the biogas concentration of the evaluation target area from the satellite image data; and evaluate biogas power generation suitability based on the size of the biogas generation facilities and the biogas concentration of the evaluation target area, wherein the processor is further configured to execute the instructions to calculate an average value of biogas concentrations of area corresponding to the evaluation target area, and wherein the processor is further configured to execute the instructions to calculate, based on the size of the biogas generation facilities that are livestock barns and the average value of the biogas concentrations of the areas corresponding to the evaluation target area, a size of livestock in the livestock barns, and calculate biogas power generation potential in the evaluation target area based on the size of livestock in the livestock barns.

\* \* \* \* \*